(12) United States Patent
Aosawa

(10) Patent No.: US 7,778,991 B2
(45) Date of Patent: Aug. 17, 2010

(54) SERVICE PROVIDING SYSTEM, COMPUTER WHICH EXECUTES PROGRAM PROVIDING SERVICE AND REPOSITORY SERVICE CONTROL PROGRAM

(75) Inventor: Takashi Aosawa, Tokyo (JP)

(73) Assignee: NEC Corporation, Tokyo (JP)

( * ) Notice: Subject to any disclaimer, the term of this patent is extended or adjusted under 35 U.S.C. 154(b) by 460 days.

(21) Appl. No.: 11/979,306

(22) Filed: Nov. 1, 2007

(65) Prior Publication Data

US 2008/0071729 A1    Mar. 20, 2008

Related U.S. Application Data

(63) Continuation of application No. 11/033,664, filed on Jan. 13, 2005, now abandoned.

(30) Foreign Application Priority Data

Jan. 15, 2004    (JP)    ............................. 2004-008518

(51) Int. Cl.
*G06F 17/00* (2006.01)
*G06F 7/00* (2006.01)
*G06F 17/30* (2006.01)

(52) U.S. Cl. .................. 707/705; 707/802; 707/640
(58) Field of Classification Search .................. 707/3, 707/101, 204
See application file for complete search history.

(56) References Cited

U.S. PATENT DOCUMENTS

| 2001/0023441 A1* | 9/2001 | Nishio et al. ................. 709/226 |
| 2002/0073146 A1* | 6/2002 | Bauer et al. ................. 709/203 |
| 2003/0110170 A1* | 6/2003 | Matsuoka ....................... 707/9 |

FOREIGN PATENT DOCUMENTS

| JP | 07-311745 | 11/1995 |
| JP | 09-223031 | 8/1997 |
| JP | 11-025060 | 1/1999 |
| JP | 2000-047894 | 2/2000 |
| JP | 2001-022709 | 1/2001 |
| JP | 2003-256390 | 9/2003 |

* cited by examiner

*Primary Examiner*—Kuen S Lu
(74) *Attorney, Agent, or Firm*—Foley and Lardner LLP

(57) ABSTRACT

In a service providing system which provides, through a network, service which is provided by a program executed on a computer to other computer, a unit is provided for providing service which can not be provided by the computer to other computer than the computer in question.

28 Claims, 15 Drawing Sheets

FIG. 10

SERVICE PROVISION INFORMATION DB 31
OF COMPUTER 3

| KIND OF SERVICE | TO BE STARTED AT THE TIME OF STARTING COMPUTER? | EXECUTION FILE NAME |
|---|---|---|
| REPOSITORY SERVICE | YES | repository |

SERVICE PROVISION INFORMATION DB 11
OF COMPUTER 1

| KIND OF SERVICE | TO BE STARTED AT THE TIME OF STARTING COMPUTER? | EXECUTION FILE NAME |
|---|---|---|
| SERVICE A | YES | serviceA |

SERVICE PROVISION INFORMATION DB 21
OF COMPUTER 2

| KIND OF SERVICE | TO BE STARTED AT THE TIME OF STARTING COMPUTER? | EXECUTION FILE NAME |
|---|---|---|
| SERVICE A | NO | serviceA |
| SERVICE B | NO | serviceB |

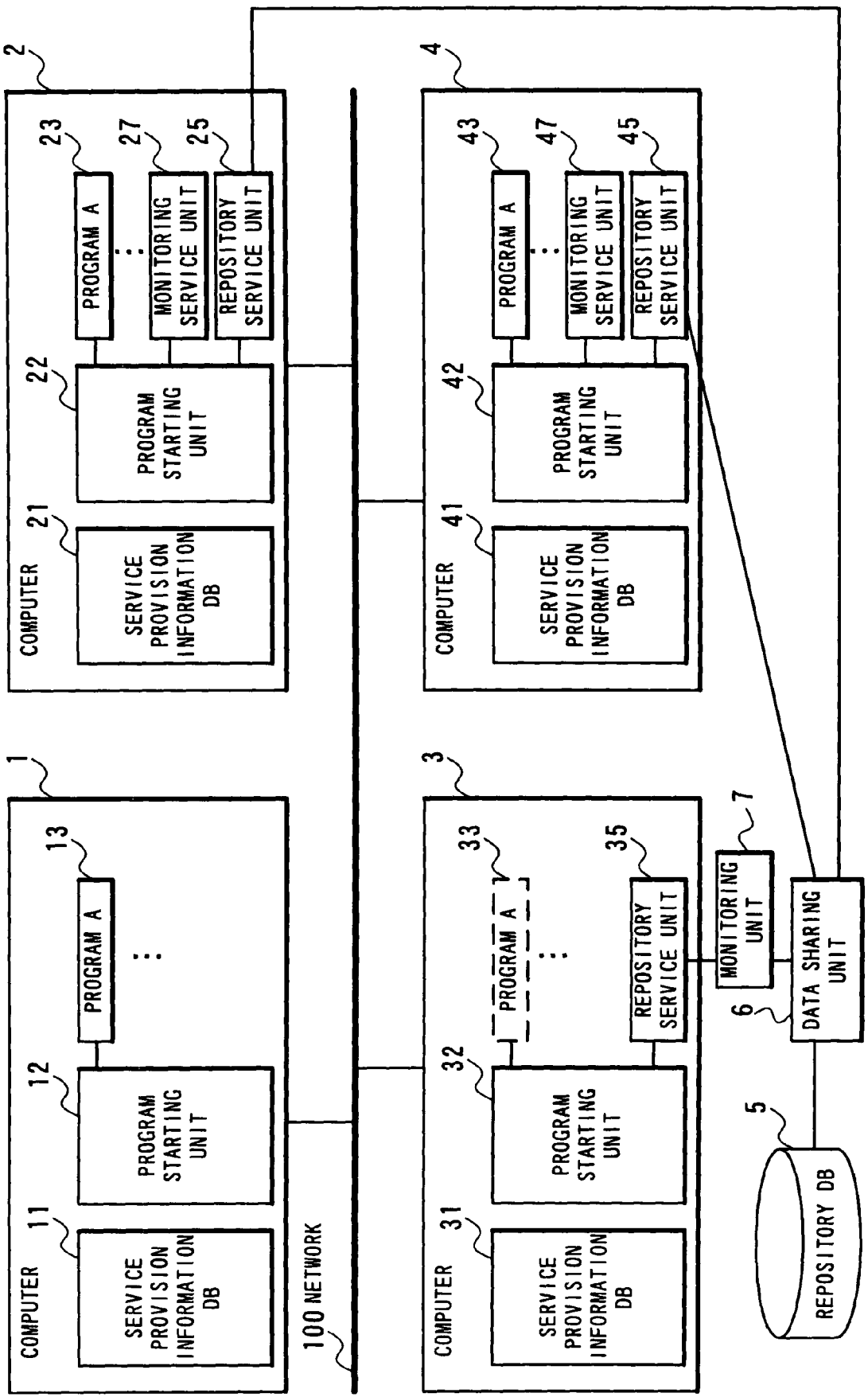

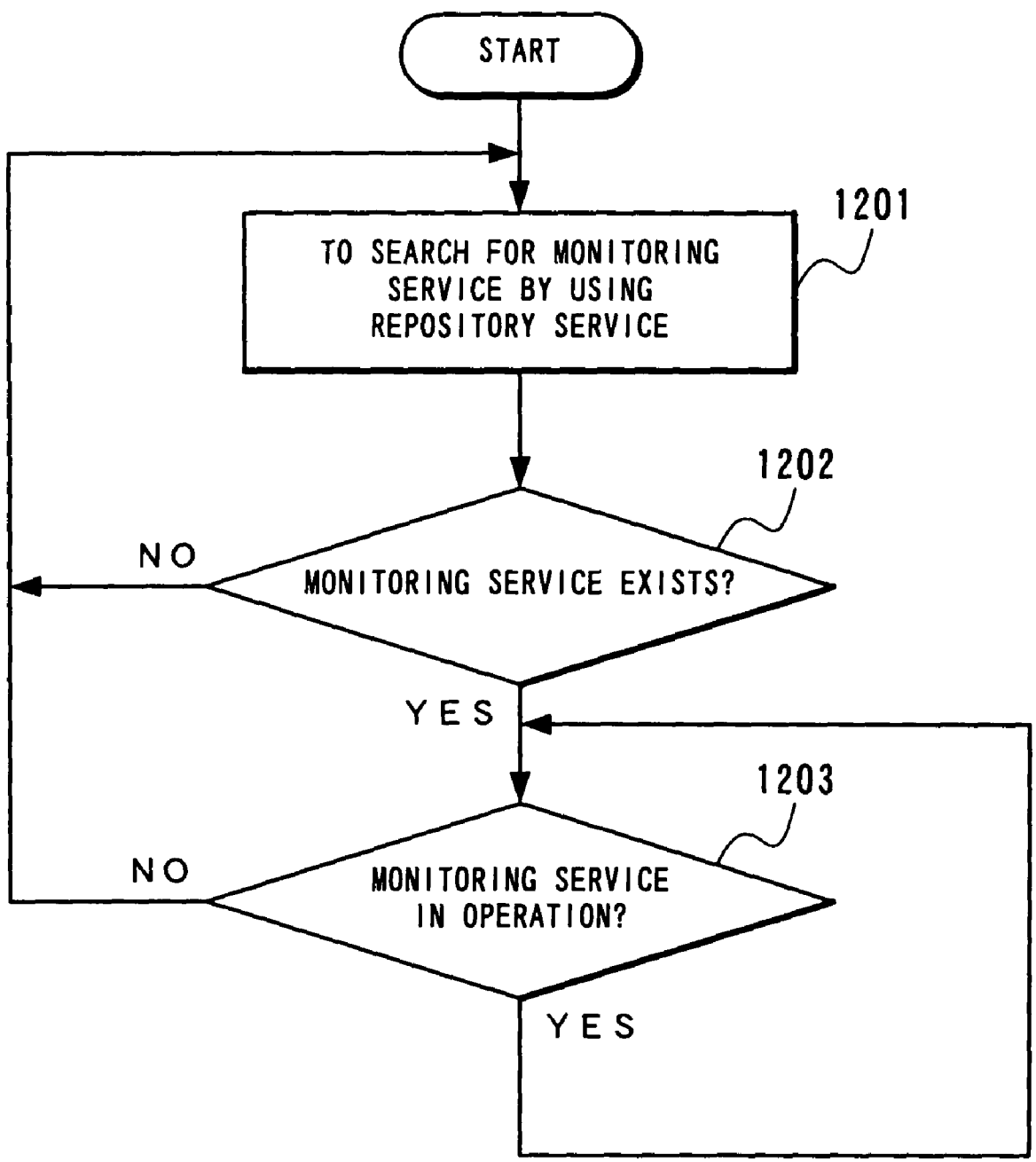

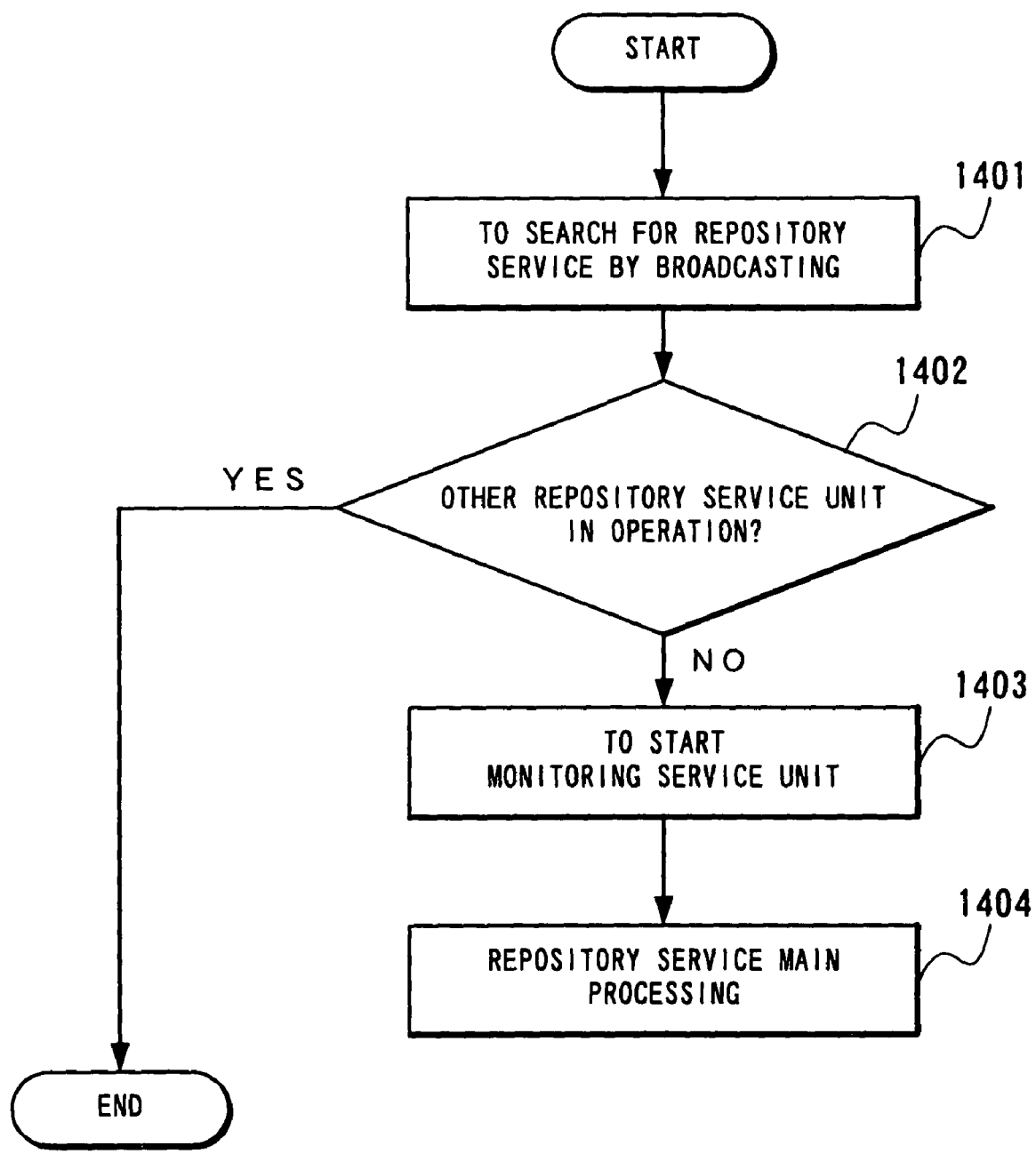

FIG. 15

SERVICE PROVISION INFORMATION DB 31
OF COMPUTER 3

| KIND OF SERVICE | TO BE STARTED AT THE TIME OF STARTING COMPUTER? | EXECUTION FILE NAME |
|---|---|---|
| REPOSITORY SERVICE | YES | repository |

SERVICE PROVISION INFORMATION DB 41
OF COMPUTER 4

| KIND OF SERVICE | TO BE STARTED AT THE TIME OF STARTING COMPUTER? | EXECUTION FILE NAME |
|---|---|---|
| MONITORING SERVICE | YES | monitor |

SERVICE PROVISION INFORMATION DB 21
OF COMPUTER 2

| KIND OF SERVICE | TO BE STARTED AT THE TIME OF STARTING COMPUTER? | EXECUTION FILE NAME |
|---|---|---|
| MONITORING SERVICE | NO | monitor | even when one computer stops operation, operation can be continued by other computer. This method, however, has the following problems.

SERVICE PROVIDING SYSTEM, COMPUTER WHICH EXECUTES PROGRAM PROVIDING SERVICE AND REPOSITORY SERVICE CONTROL PROGRAM

CROSS-REFERENCE TO RELATED PATENT APPLICATIONS

This application is a continuation of application Ser. No. 11/033,664, filed Jan. 13, 2005, now pending, and based on Japanese Patent Application No. 2004-008518, filed Jan. 15, 2004, by Takashi Aosawa, which are both incorporated herein by reference in their entirety. This application claims only subject matter disclosed in the parent application and therefore presents no new matter.

BACKGROUND OF THE INVENTION

1. Field of the Invention

The present invention relates to a service providing system which provides services which are provided by a program executed on a computer through a network to other computer, and more particularly, to a service providing system enabling a service which can not be provided due to a failure or maintenance of a computer to be provided from other computer.

2. Description of the Related Art

Conventionally proposed methods of coping with a situation where a computer fails to operate due to a failure or maintenance of the computer are increasingly redundant. One method copes with such a situation by shifting execution of a program to other computer, in which even when one computer stops operation, operation can be continued by other computer. This method, however, has the following problems.

Consider a case where with a program being executed on one computer, the program provides services to a plurality of other computers through a network. There will be a case where, for one reason or another, for example, due to a failure or maintenance of a computer, the program needs to be shifted to other computer in order to continue service provision.

In this case, the first problem is that it is necessary to install the program on other computer and activate an alternative program.

Next, when a computer which provides services is changed, a computer which will receive the service is not allowed to detect change of location of the computer providing the service. This prevents the computer which receives the service from accessing the computer which provides the service and accordingly prevents the same from receiving the service, which is the second problem.

Examples of methods which solve these problems are recited in Japanese Patent Laying-Open (Kokai) No. 2001-22709 (Literature 1) and Japanese Patent Laying-Open (Kokai) No. 2000-47894 (Literature 2), for example.

In the method disclosed in Literature 1, a plurality of computers are connected through a network, with each computer having a means for detecting abnormality of a program.

When abnormality of a program is detected in one of the plurality of computers, the program is re-started at the computer in which the program abnormality is detected. When the program abnormality is not eliminated even by the re-starting, the program will be executed on other computer.

In the method disclosed in Literature 2, a plurality of computers are connected through a network, with each computer being provided with a monitoring means for monitoring an operation condition which means storing an operation condition of each computer in a monitoring information repository (which is a data base to be internally used by a system) connected with each computer through the network. Operation conditions include a CPU load and a memory free capacity of a computer.

When the monitoring means detects abnormality of other computer, based on information of the monitoring information repository, select an alternative computer having a small CPU load or a small memory free capacity and take over the processing to the selected computer.

The above-described conventional techniques have the following shortcomings.

In a case where a program is executed on one computer and the program provides services to a plurality of other computers through a network, according to the method disclosed in Literature 1, the first problem of the necessity of installing the program on other computer to activate a program as an alternative can be solved by executing the program on other computer.

When a computer which provides services is changed, however, a computer which receives the services is incapable of detecting the change of location of the computer providing the services, so that it can not access the computer which provides the services. As a result, the second problem can not be solved that an access from the computer receiving the services to the computer providing the services is disabled to prevent service provision.

On the other hand, according to the method disclosed in Literature 2, when the monitoring means detects abnormality of other computer, an alternative computer having a small CPU load or a small memory free capacity is selected based on the information of the monitoring information repository to take over the processing to the selected computer. Therefore, the first problem of the need of installing the program on other computer to activate an alternative program can be solved.

However, because a change of location of a computer which provides the service can not be detected, an access from the computer receiving the service to the computer providing the service is impossible. Therefore, similarly to the method disclosed in Literature 1, the second problem that the computer receiving the service is not allowed to receive services from the computer which provides the service can not be solved.

SUMMARY OF THE INVENTION

A first object of the present invention is to provide a service providing system, a computer and a repository service control program which eliminate the above-described shortcomings of the conventional art and which, in a service providing system in which a program operating on a computer provides services to other computer through a network, when a failure, maintenance or the like of the computer prevents service provision, enabling provision of the same service from other computer.

A second object of the present invention is to provide a service providing system, a computer and a repository service control program which, in the above-described system, when a failure, maintenance or the like of the computer prevents service provision, enables a computer receiving the service to obtain location information of an alternative computer that provides the service in order to continuously receive the service.

According to the first aspect of the invention, a system of providing, through a network, service which is provided by a program executed on a computer to other computer, comprises a program providing unit which provides said service, that can not be provided by the computer, from other computer to said computer, which receives said service, and a repository service unit which provides a service of managing location information for uniquely identifying, on the network, a computer on which said program operates.

In the preferred construction, the repository service unit is provided in a specific computer among a plurality of computers on the network.

In another preferred construction, the repository service unit is provided in a specific computer among a plurality of computers on said network, and the repository service unit conducts processing of replying, to a request from the program operating on any of the plurality of computers, with location information of an activating computer which activates said program and processing of rewriting data of a repository data base which stores the location information in response to a request from the program.

In another preferred construction, the system comprises a repository service unit which provides service of managing location information for uniquely identifying, on the network, a computer on which predetermined the program operates, wherein the repository service unit is provided in a specific computer among a plurality of computers on the network, and the repository service unit further conducts processing of replying, to an inquiry from the program activated, with the location information of the specific computer having the repository service unit.

In another preferred construction, the processing of replying with the location information comprises searching the repository data base for location information of said activating computer, wherein information is inquired by a location information search program operating on any of the plurality of computers and when said service by said program is in operation, replies to the location information search program having made an inquiry with location information of said activating computer.

In another preferred construction, the processing of rewriting data of the repository data base comprises rewriting the data of the repository data base in response to said request from the program and replying to the program with a result of the rewriting.

In another preferred construction, the processing of making a service request by the program to other computer comprises checking whether the program has location information of the other computer, and when the program fails to have the information, requesting the location information from the repository service unit.

In another preferred construction, the repository service unit is provided in a specific computer among a plurality of computers on said network, wherein the plurality of computers each include a program starting unit which starts a program that provides the service and a service provision information data base which stores information about a kind of the service and information about a kind of the service to be started at the time of starting the computer.

In another preferred construction, the program starting unit is started simultaneously with activation of the computer.

In another preferred construction, the program starting unit is started simultaneously with activation of the computer, and processing of starting the program starting unit refers to information of the service provision information data base and when activation is necessary, starts the repository service unit, and when there exists other program required to be started, starts said other program.

In another preferred construction, the program starting unit is started simultaneously with activation of the computer, and main processing of the program starting unit includes processing of, after accepting a request from programs of the plurality of computers, referring to the service provision information data base to determine whether a service corresponding to the request can be started or not, and when the service can be started, starting or re-starting a program which provides the service in question.

In another preferred construction, the repository service unit is provided in at least one computer among a plurality of computers on the network.

In another preferred construction, the system further comprises a monitoring service unit which monitors operation of the repository service unit is provided in said at least one computer.

In another preferred construction, the system further comprises a monitoring service unit, which monitors operation of the repository service unit, is provided in said at least one computer, a monitoring unit which monitors operation of the monitoring service unit, and a data sharing unit for sharing location information data managed by the repository service unit among the plurality of computers.

In another preferred construction, processing of the monitoring unit comprises searching the monitoring service unit to continue checking operation of the monitoring service unit.

In another preferred construction, the system further comprises a monitoring service unit which monitors operation of the repository service unit is provided in said at least one computer, and processing of the monitoring service unit comprises monitoring the repository service unit provided at said at least one computer and when none of the repository service units operates, starting at least one of the repository service units.

In another preferred construction, the system further comprises a monitoring service unit, which monitors operation of the repository service unit, is provided in said at least one computer, and initial processing of the repository service unit comprises refraining from starting the repository service unit when other repository service unit operates.

According to the second aspect of the invention, a computer which executes a program that provides a service through a network comprises a repository service unit which provides a service of managing location information for uniquely identifying, on the network, a computer on which said program operates, wherein the repository service unit conducts processing of replying, to a request from the program operating on any of a plurality of computers in the network, with location information of an activating computer which activates said program and processing of rewriting data of a repository data base which stores the location information in response to a request from the program.

In the preferred construction, the repository service unit further conducts processing of replying, to an inquiry from the activated program, with the location information of the activating computer having the repository service unit.

In another preferred construction, the processing of replying with the location information comprises searching the repository data base for location information of said activating computer, wherein said location information is inquired by a location information search program operating on any of the plurality of computers and when service by said program is in operation, replies to the location information search program having made an inquiry with location information of the activating computer.

In another preferred construction, the processing of rewriting data of the repository data base comprises rewriting the data of the repository data base in response to a request from the program and replying to the program with a result of the rewriting.

In another preferred construction, the computer comprises a program starting unit which starts a program that provides the service, and a service provision information data base which stores information about a kind of the service and information about a kind of the service to be started at the time of starting the computer.

In another preferred construction, processing of starting the program starting unit refers to information of the service provision information data base and when activation is necessary, starts the repository service unit, and when there exists other program required to be started, starts said other program.

According to a further aspect of the invention, a repository service control program executed on a computer on which a program operates that provides service through a network comprises the functions of a function of providing service of managing location information for uniquely identifying, on the network, a function of replying, to a request from a program operating on any of a plurality of computers connected to the network, with location information of an activating computer which activates said program, and a function of rewriting data of a repository data base which stores the location information in response to a request from the program.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 10 is a diagram showing one example of data stored in a service provision information DB according to the first embodiment of the present invention;

FIG. 11 is a block diagram showing a structure of a service providing system according to a second embodiment of the present invention;

FIG. 12 is a flow chart for use in explaining processing of a monitoring unit according to the second embodiment of the present invention;

FIG. 14 is a flow chart for use in explaining a flow of initial processing of a repository service unit according to the second embodiment of the present invention; and FIG. 15 is a diagram showing one example of data stored in a service provision information DB according to the second embodiment of the present invention.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

In the following, preferred embodiments of the present invention will be described in detail with reference to the drawings.

Figure 1:
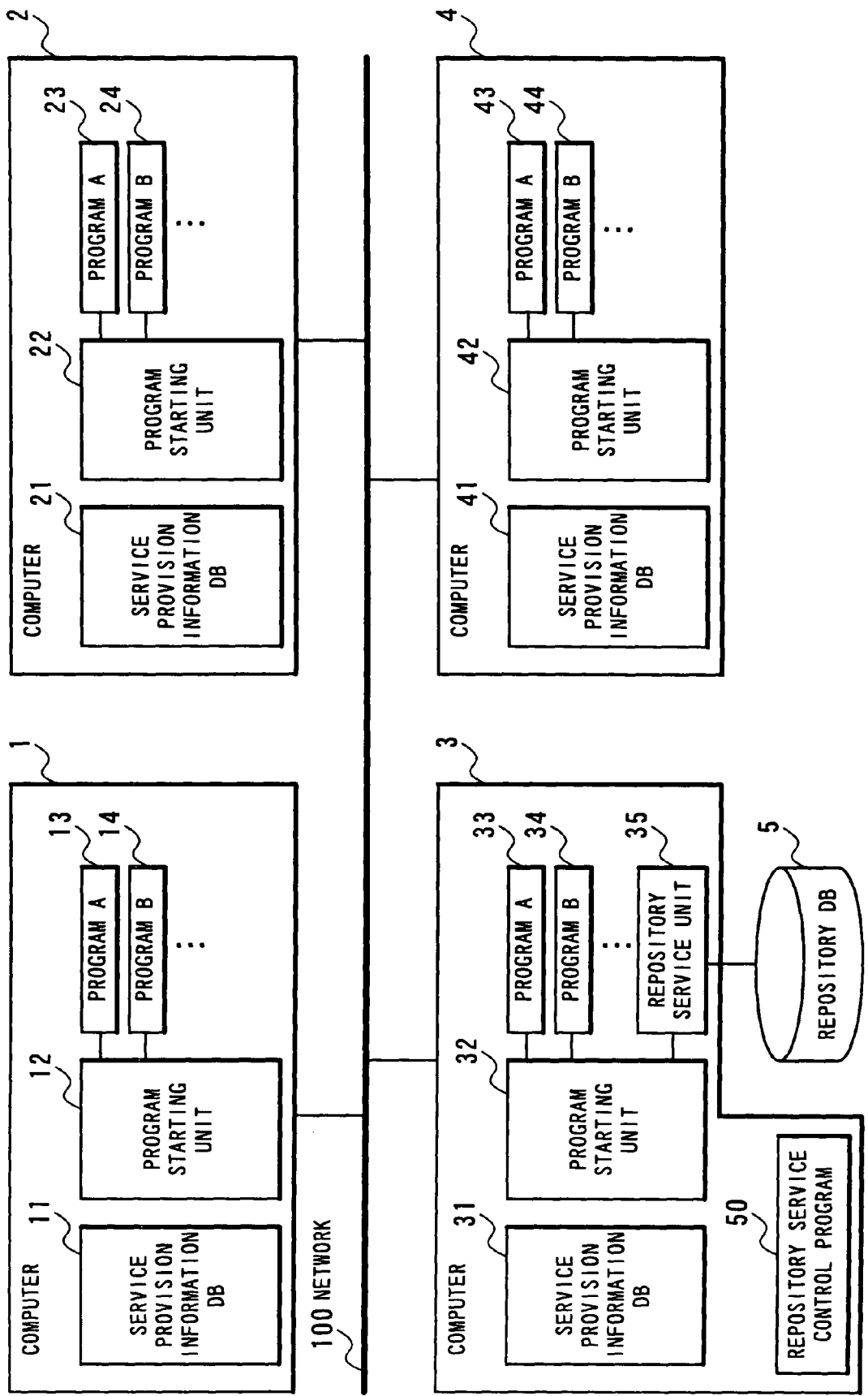
FIG. 1 is a block diagram showing a structure of a service providing system according to a first embodiment of the present invention.

FIG. 1 is a block diagram showing a structure of a service providing system according to a first embodiment of the present invention.

With reference to FIG. 1, a computer 1, a computer 2, a computer 3 and a computer 4 are connected through a network 100. The computer 1, the computer 2 and the computer 4 have the same structure. The computer 3 is equivalent to the structure of the computer 1 with a repository service unit 35 (repository is a data base used by the system) added. The repository service unit 35 is connected to a repository data base (DB) 5.

Description will be first made of the structure of the computer 3 having the repository service unit 35 and then of the structure of the computers 1, 2 and 4. Computer 3 is an exemplary activating computer, because it contains the information necessary to start and provide services.

The computer 3 according to the present embodiment includes a service provision information DB 31, a program starting unit 32, a program A33 which provides service A, a program B34 which provides service B and the repository service unit 35. Although programs which provide services here have two kinds, the program A33 and the program B34 as an example, the number of kinds of programs is arbitrary.

The service provision information DB 31 is capable of storing information about kinds of services which can be provided by the computer 3 and information about kinds of programs to be started at the time of starting the program starting unit 32.

With reference to the service provision information DB 31, the program starting unit 32 determines whether to start the repository service unit 35 and can start the unit when necessary. In addition, when an inquiry about whether certain service can be provided is made through the network 100, make a reply with reference to the service provision information DB 31. When a request for service provision is made, start a relevant program if possible with reference to the service provision information DB 31.

The program A33 and the program B34 are both programs which provide services and are execution files. Both programs send and receive information through the network 100 to provide services to other computer or its own computer and contents of the services are arbitrary. Among examples of contents are processing such as execution of routine computation, information management and specific hardware control. The program A33 and the program B34 are stored in a storage device of the computer 3.

The repository service unit 35 is capable of managing service information and accepting a request for reading and writing information from/to the repository DB 5. It also enables data to be shared between services operating on the computers 1, 2, 3 and 4.

The repository service unit 35 accepts a request from a program of other computers 1, 2 and 4 or other program of its own computer 3 transmitted through the network 100. Upon receiving a request for use from each computer, the unit reads/writes data from/to the repository DB 5.

In addition, with respect to the computers connected to the network 100, the unit has location information for identifying a computer on which a program operates (hereinafter referred to as location information) and provides the information upon a request from other service.

When requested location information of service not in operation on any of the computers connected to the network 100, the repository service unit 35 inquires of program stating units 12, 22, 32 and 42 of the respective computers whether the service in question can be provided or not and asks a program starting unit which has made a reply that the provision is possible to start the program whose location information (computer numbers 1 to 4 here) is requested.

Although in the present embodiment, location information is assumed to be the computer numbers 1, 2, 3 and 4, which is one example only, any information can be used that can identify a computer such as a computer lot number or a name of place where the computer is disposed.

The repository DB 5 stores service information such as data from the repository service unit 35 and data necessary for starting a program of each computer.

Next, the structure of the computers 1, 2 and 4 will be described.

The structure of the computers 1, 2 and 4 is the same as the structure of the computer 3 with the only difference in that the repository service unit 35 is not provided. Since the structures of the computers 1, 2 and 4 are the same, the description will be made of the structure of the computer 1.

With reference to the computer 1 shown in FIG. 1, a service provision information DB 11 is capable of storing information about a kind of service operable on the computer 1 and information about a kind of program to be activated at the time of starting a program.

When inquired whether certain service can be provided through the network 100, the program starting unit 12 makes a reply with reference to the service provision information DB 11. When asked to start a program through the network 100, the unit refers to the service provision information DB 11 and starts the relevant program when possible.

A program A13 and a program B14 are both programs which provide services and are execution files. The program A13 is the same as the program A33 of the computer 3 and the program B14 is the same as the program B34 of the computer 3. The program A13 and the program B14 are stored in a storage device of the computer 1.

Both programs send and receive information through the network 100 to provide services to other computers or their own computers, and their contents are arbitrary. Among examples of contents are processing such as execution of routine computation, information management and specific hardware control.

Next, operation of the present embodiment will be described in detail with reference to the drawings.

First, description will be made of activation processing of the program starting units 12, 22, 32 and 42 and main processing of the same. Next, description will be made of operation of the repository service unit 35 and service activation reception processing, location information inquiry processing and repository registration processing which are repository services. Description will be then made of program activation processing and service requesting processing of a program which provides services. With respect to activation processing of the program starting units 12, 22, 32 and 42, the description will be made of a case of the program starting unit 32.

Figure 2:
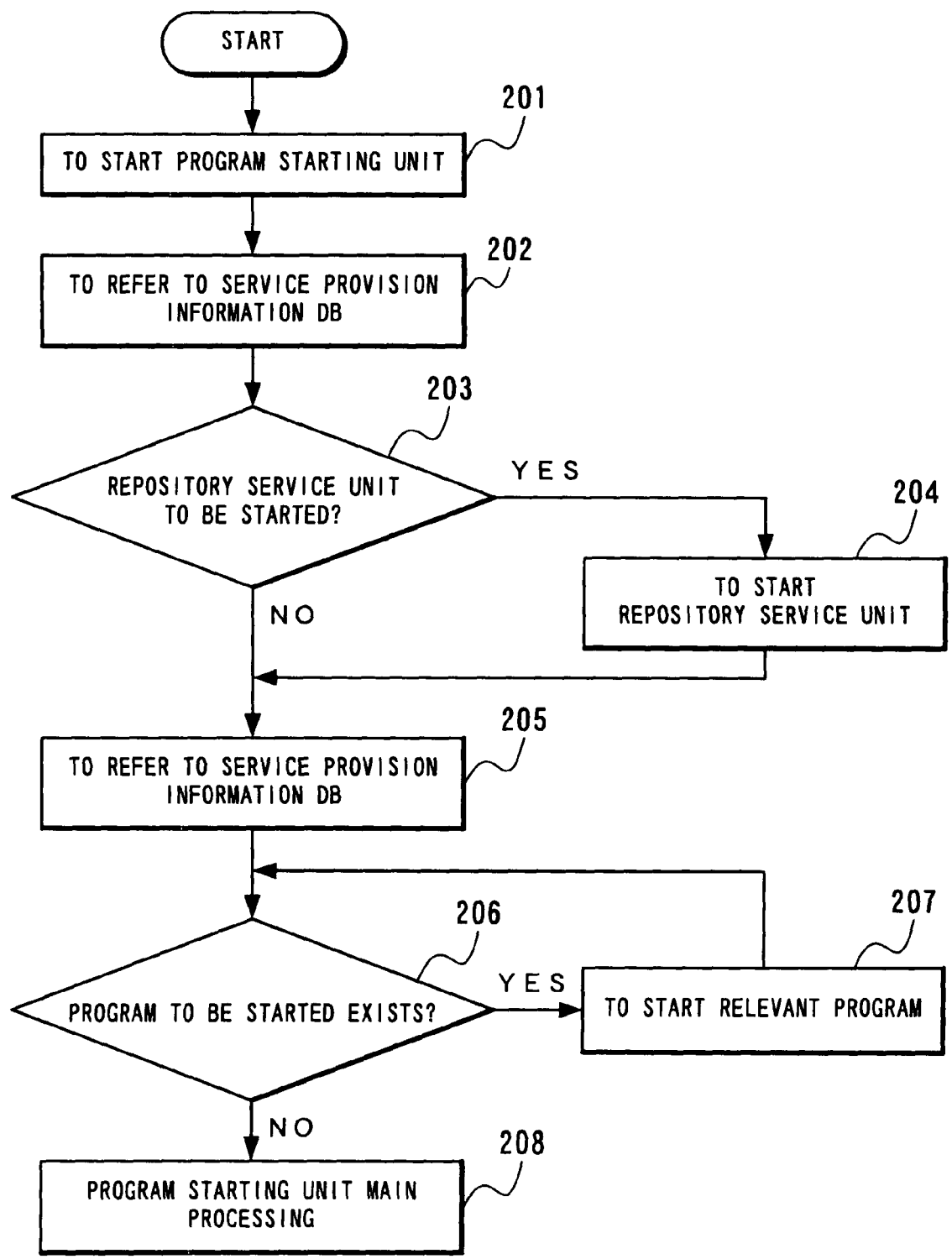
FIG. 2 is a flow chart for use in explaining operation of activation processing of a program starting unit according to the first embodiment of the present invention.

FIG. 2 is a flow chart for use in explaining operation of activation processing of the program starting unit 32 according to the present embodiment. Main part of FIG. 1 will be referred to when necessary.

With reference to FIG. 2, when first starting the program starting unit 32 (Step 201), refer to the service provision information DB 31 (Step 202) to determine whether the repository service unit 35 should be started or not (Step S203) and when necessary, start the repository service unit 35 (Step 204).

Next, with reference to the service provision information DB 31 (Step 205), determine whether there exists other program to be started (Step 206).

When there is a program to be started, start the relevant program (Step 207) to repeat Steps 206 and 207 until there remains no program to be started. After finishing the foregoing activation processing, shift to the main processing of the program starting unit (Step 208).

Figure 3:
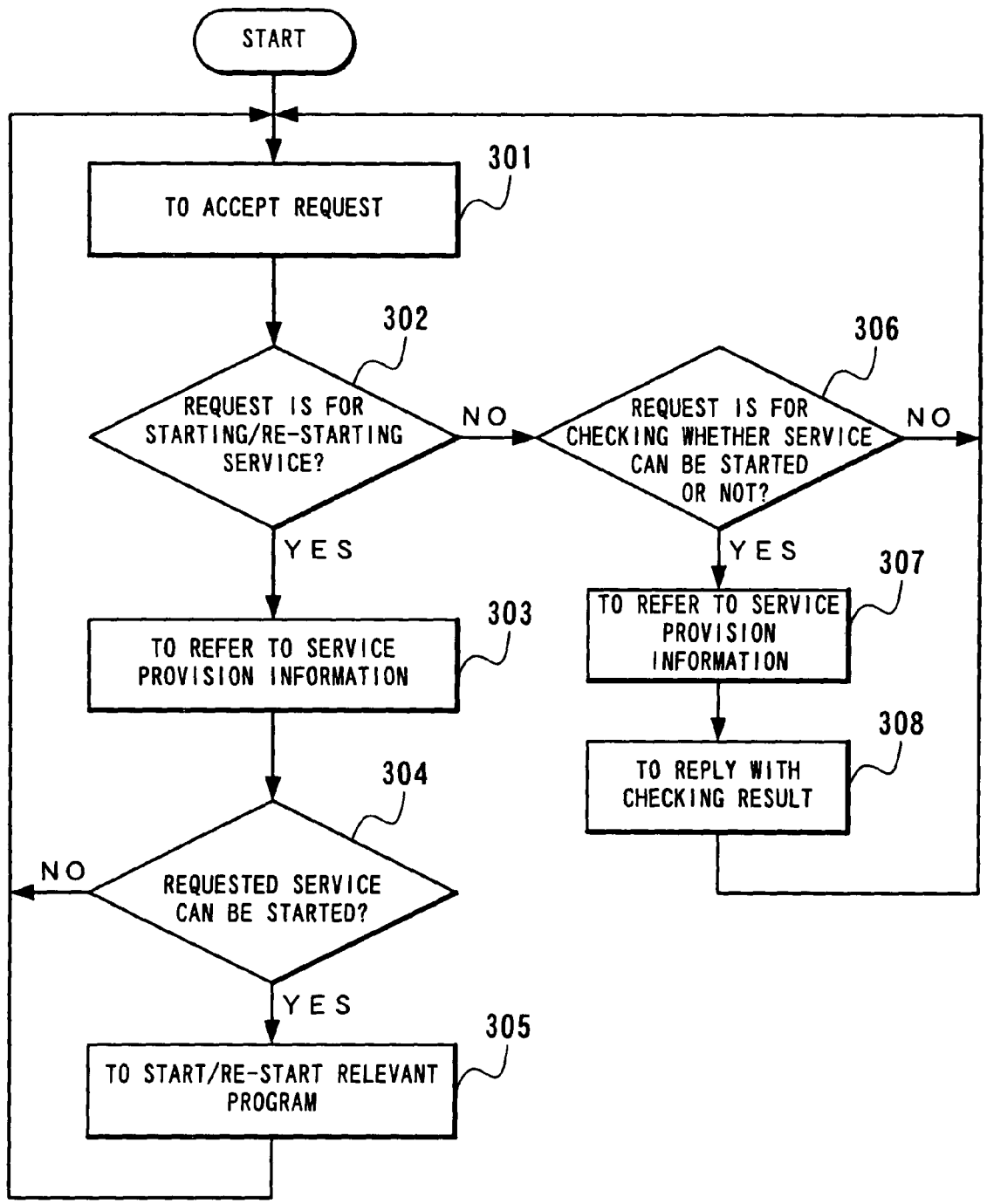
FIG. 3 is a flow chart for use in explaining operation of main processing of the program starting unit according to the first embodiment of the present invention.

FIG. 3 is a flow chart for use in explaining main processing operation of the program starting unit 32 according to the present embodiment.

With reference to FIG. 3, the program starting unit 32 first accepts a request from a program of other computer or from other program of its own computer which is sent through the network 10 (Step 301).

Determine whether the request is for starting or re-starting a program (hereinafter referred to as start/re-start for abbreviation) (Step 302) and when the request is for starting/re-starting, refer to the service provision information DB 31 (Step 303) to determine whether a program corresponding to the request can be activated (Step 304).

When the program can be activated, start/re-start the relevant program of its own computer (Step 305) and again return to Step 301 to accept a new request.

When the designated program can not be started, again return to Step 301 to accept a new request.

On the other hand, when the request accepted at Step 301 is not for program start/re-start, determine whether the request is a request for checking whether the program can be started or not (Step 306).

When the request is for other processing, again return to Step 301 to accept a new request.

When the request is for checking whether the program can be started or not, refer to the service provision information DB 31 (Step 307) to return a check result to a requesting source (Step 308).

After making a reply, again return to Step 301 to accept a new request.

Figure 4:
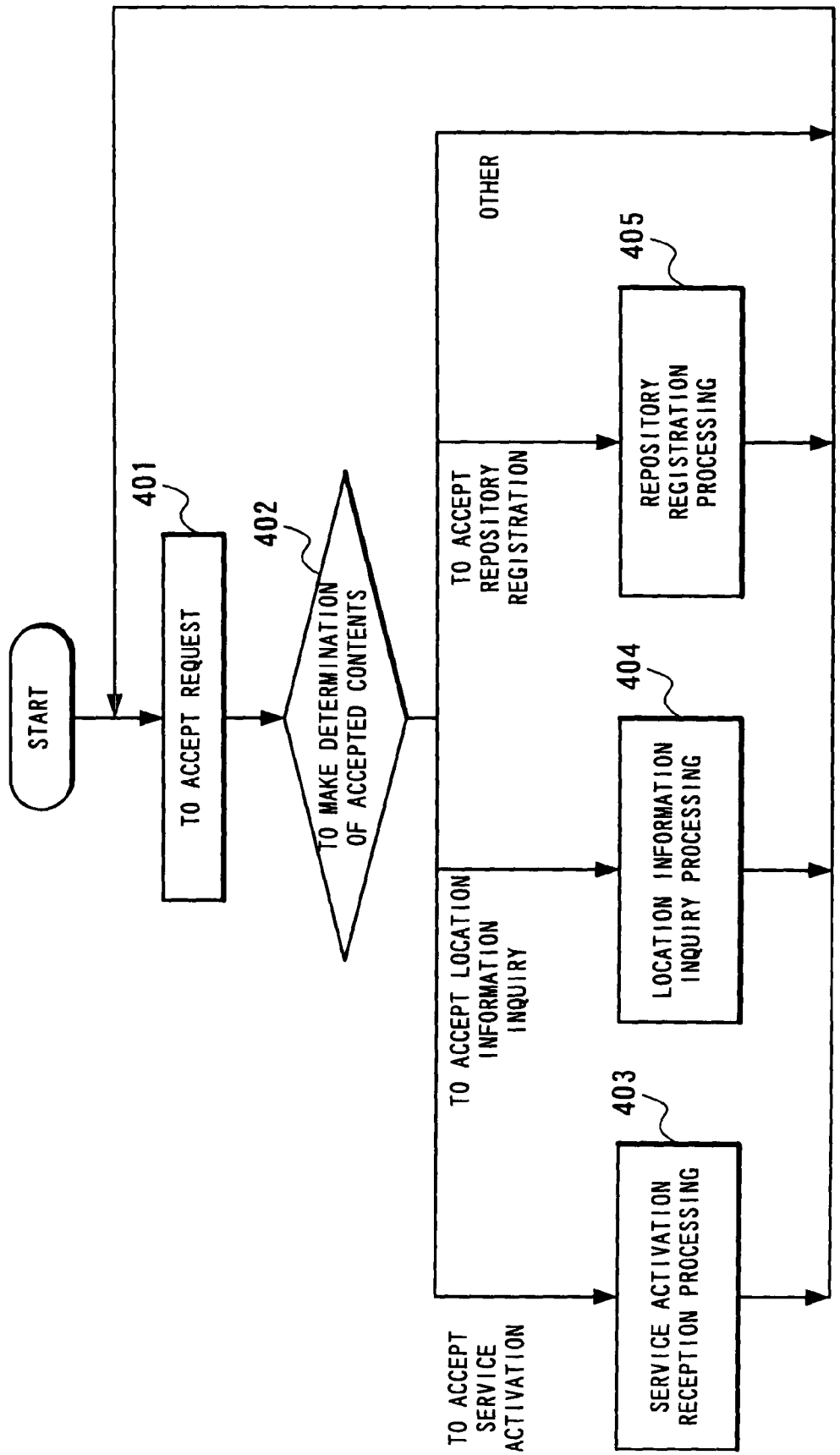
FIG. 4 is a flow chart for use in explaining operation of a repository service unit according to the first embodiment of the present invention.

FIG. 4 is a flow chart for use in explaining operation of the repository service unit 35 according to the present embodiment.

With reference to FIG. 4, first, the repository service unit 35 accepts a request from a program of other computer or from other program of its own computer which is transmitted through the network 100 (Step 401).

Analyze the contents of the request at Step 402 to shift to the service activation reception processing (Step 403), or location information inquiry reception (Step 404) or repository registration processing (Step 405).

When the request is one that can not be processed or when each processing is completed, return to Step 401 to accept a new request.

In the following, service activation reception processing, location information inquiry reception and repository registration processing will be described.

Figure 5:
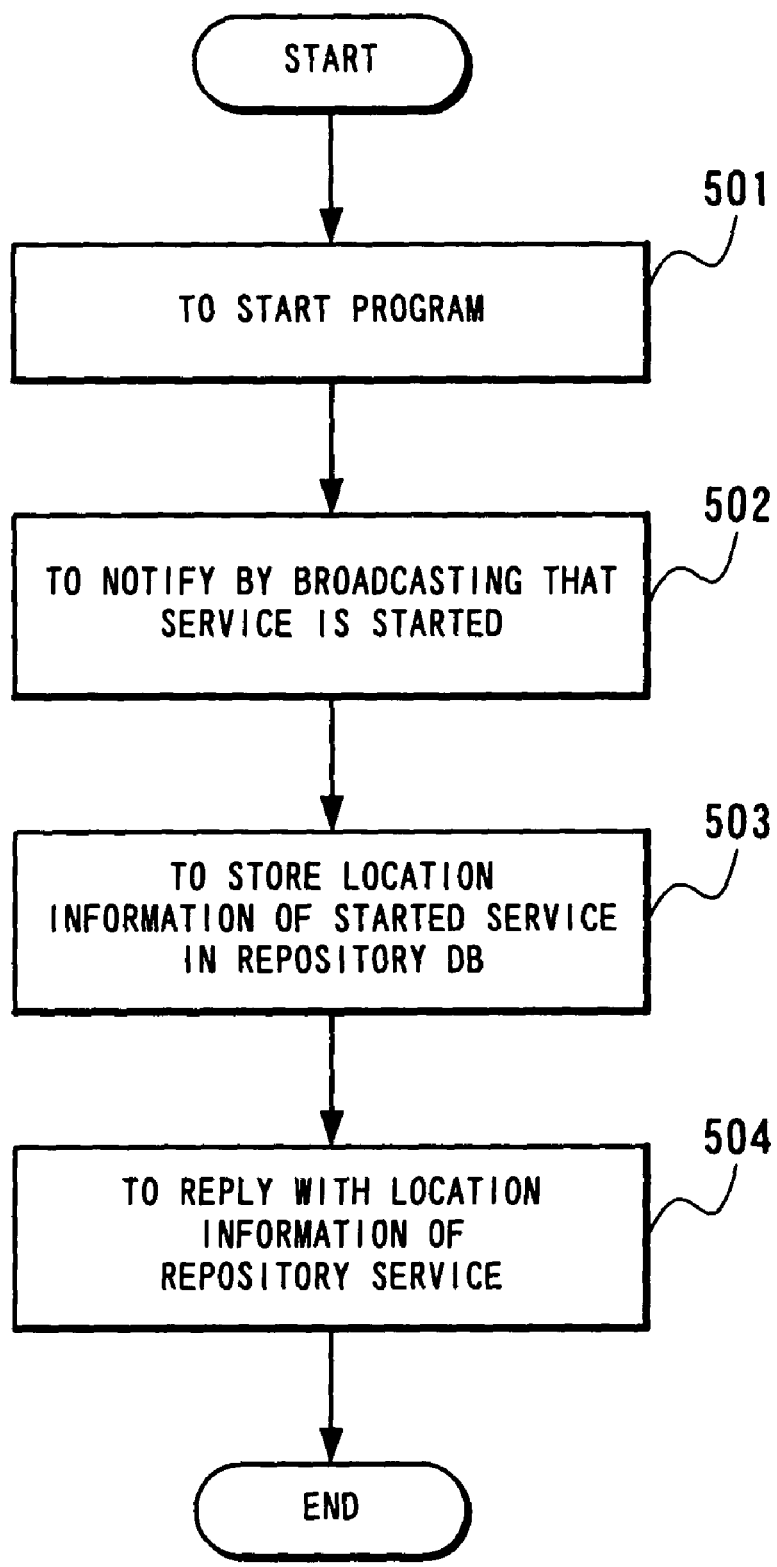
FIG. 5 is a flow chart for use in explaining operation of service activation reception processing according to the first embodiment of the present invention.

FIG. 5 is a flow chart for use in explaining operation of service activation reception processing according to the present embodiment. The service activation reception processing is processing of, upon receiving a notification from a program of an activated computer, returning location information of the repository service unit 35 to the program.

With reference to FIG. 5, first, the program starting units 12, 22, 32 and 42 start the programs of their own computers (Step 501).

The program notifies by broadcast (transmission to all the terminals connected to the network) that the program has been started (Step 502).

Contents of the notification include a kind of service and location information of a computer in which the service starts.

The repository service unit 35 obtains the notification and stores the same in the repository DB 5 (Step 503).

Next, the repository service unit 35 returns the location information of the repository service unit 35 to the started program (Step 504).

Because the location information is obtained, the started program is allowed to communication with the repository service unit 35.

Figure 6:
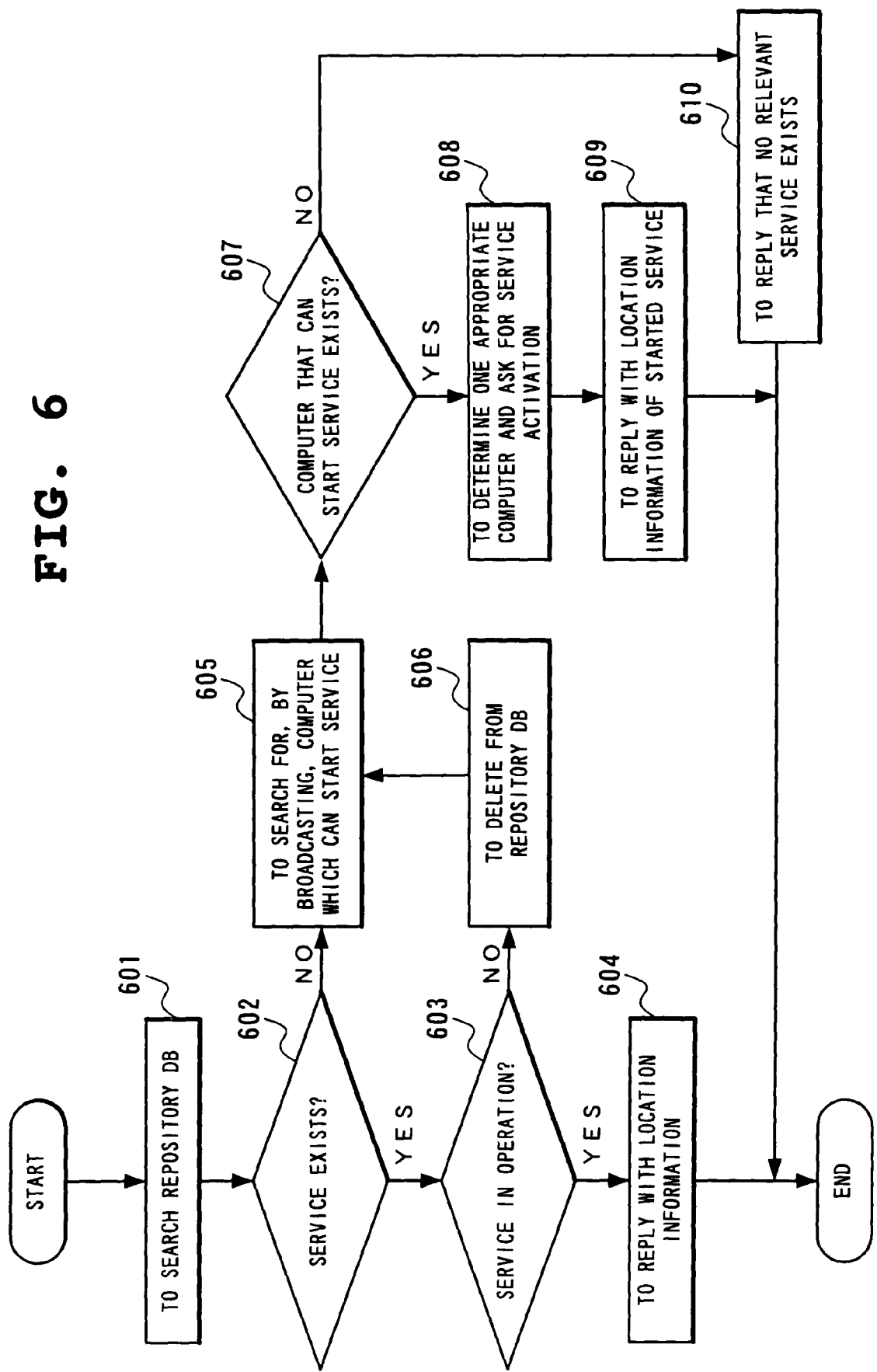
FIG. 6 is a flow chart for use in explaining operation of location information inquiry processing according to the first embodiment of the present invention.

FIG. 6 is a flow chart for use in explaining operation of location information inquiry processing according to the present embodiment. The location information inquiry processing is processing of, upon receiving a location information request from an activated program, replying to the program in question with a program in operation and its location information.

With reference to FIG. 6, the repository service unit 35 first searches the repository DB 5 with a kind of service as a key item (Step 601).

In a case where the relevant program has been activated before, confirm its existence because its location data is stored in the repository DB 5 (Step 602).

When it is confirmed that the relevant program was activated before, check whether the service in question is actually in operation or not by using the location information (Step 603).

When the program is in operation, reply to a program having asked for an inquiry for location information with the location information (Step 604) to end the processing.

Next, when the determination is made at Step 602 that there exists no relevant service in the repository DB 5, make broadcasting flow through the network 100 (Step 605) to ask a computer which can activate the relevant program for a reply (Step 607).

When receiving no reply from any of the computers, make a reply that no relevant program exists (Step 610) to end.

On the other hand, when receiving a reply from a plurality of computers which can activate service at Step 607, select an arbitrary one of them to ask the selected computer for activating the program (Step 608).

Thereafter, reply to the program which has requested location information inquiry with the location information of the computer to which the activation request is made (Step 609) to end the processing.

Next, in a case where the determination is made at Step 603 that while location information of the computer having the relevant program activated exists in the repository DB 5, the program is not actually in operation, delete the location information from the repository DB 5 (Step 606).

Thereafter, proceed to Step 605 to conduct the same processing as that of a case where the location information fails to exist in the repository DB 5.

Figure 7:
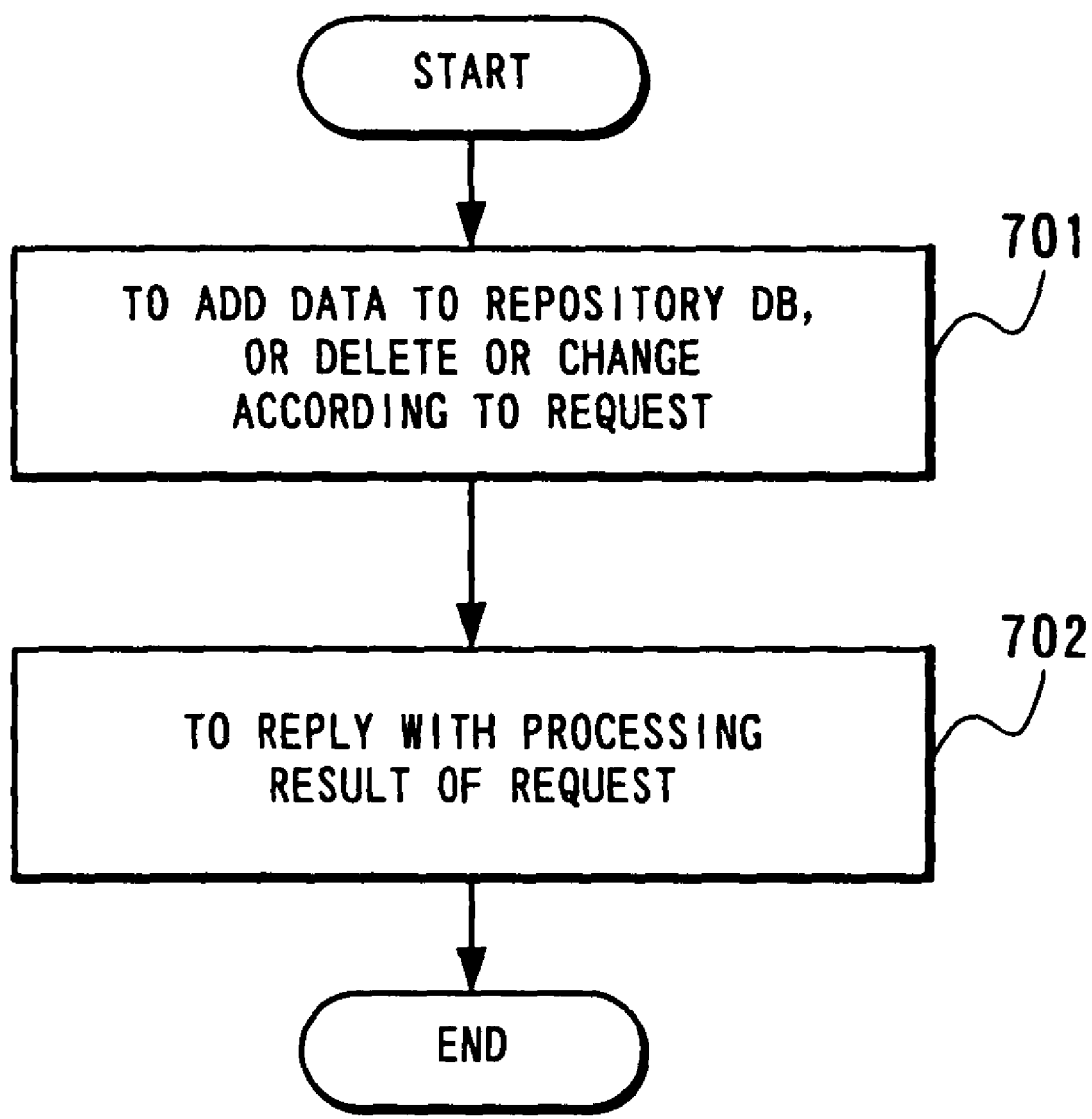
FIG. 7 is a flow chart for use in explaining operation of repository registration processing according to the first embodiment of the present invention.

FIG. 7 is a flow chart for use in explaining operation of repository registration processing according to the present embodiment.

With reference to FIG. 7, conduct data addition to the repository DB 5, or deletion or modification of the same in response to a request from an activated program at Step 701 (Step 701).

Return the results of the processing to a requesting source program (Step 702).

Next, description will be made of processing of starting a program which will provide service and processing of requesting service of the program.

Figure 8:
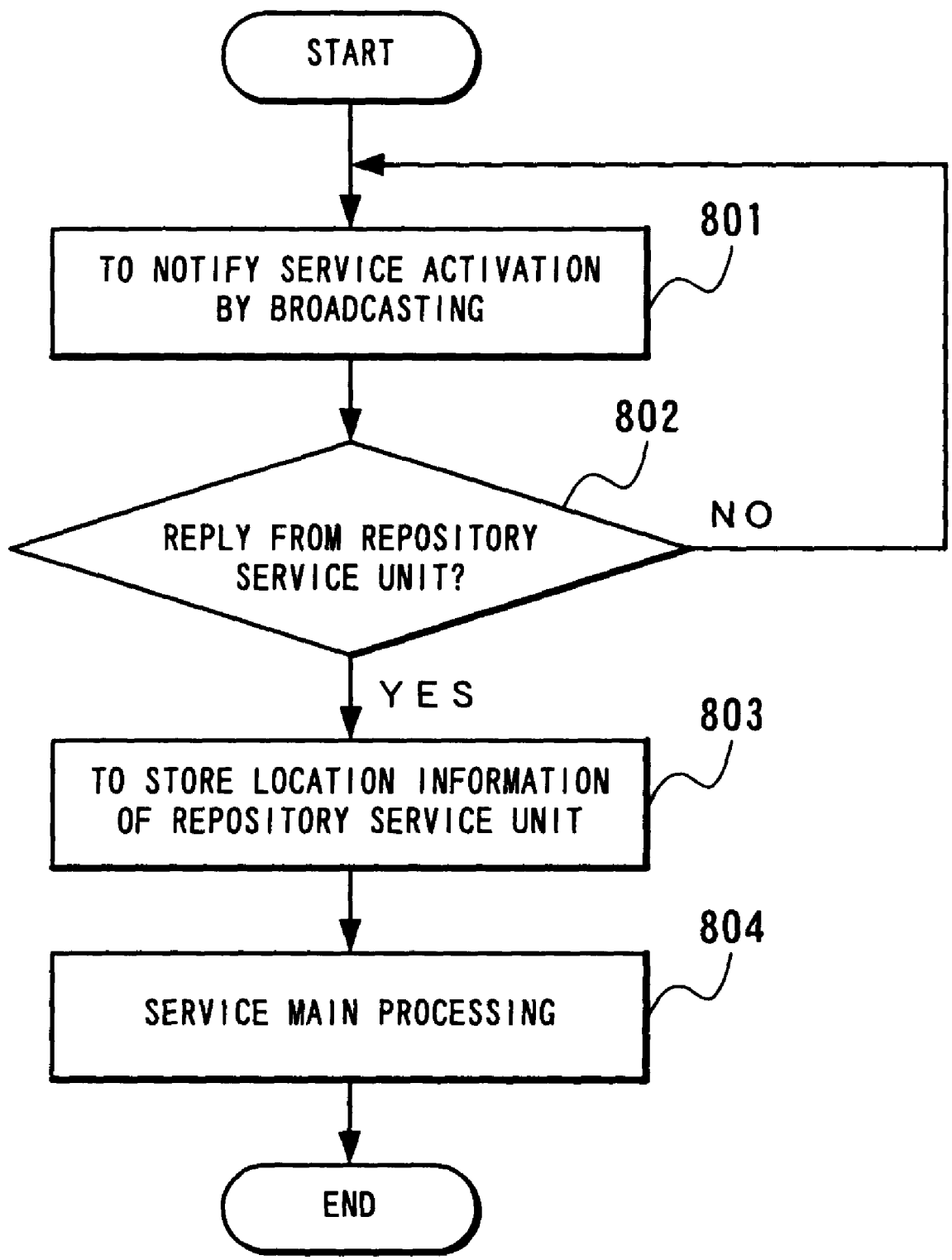
FIG. 8 is a flow chart for use in explaining activation processing of a program according to the first embodiment of the present invention.

FIG. 8 is a flow chart for use in explaining program activation processing according to the present embodiment. Main part of FIG. 1 will be referred to as necessary.

With reference to FIG. 8, the program first notifies by broadcasting that the service is started through the network 100 (Step 801).

Thereafter, wait for a reply from the repository service unit 35 (Step 802).

When receiving no reply, again return to Step 801 to notify that the service is started.

When receiving a reply from the repository service unit 35, store the location information of the repository service unit 35 (Step 803) to execute main processing of the service (Step 804).

Figure 9:
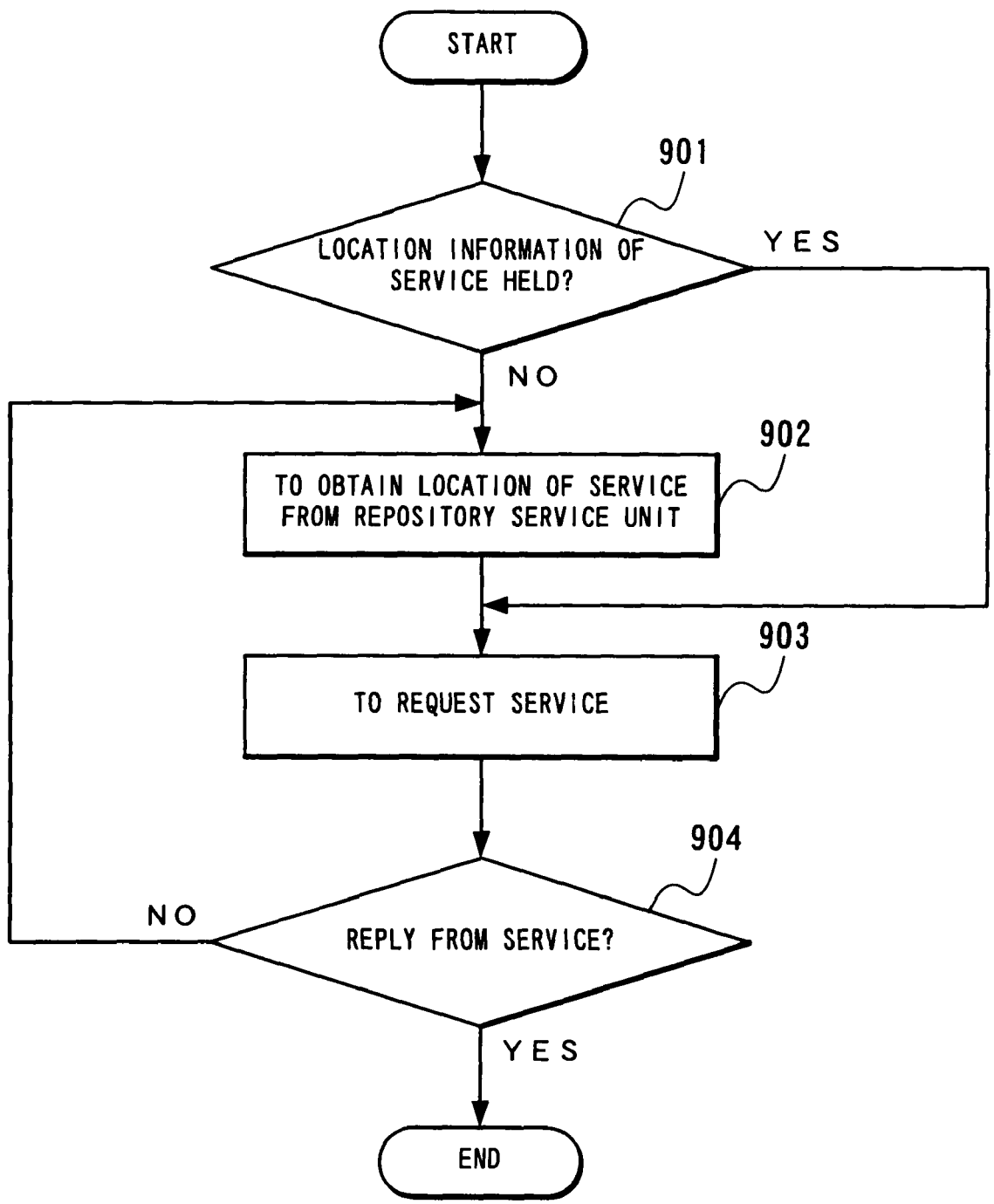
FIG. 9 is a flow chart for use in explaining service requesting processing according to the first embodiment of the present invention.

FIG. 9 is a flow chart for use in explaining service requesting processing in a case where the program makes a request to other program according to the present embodiment.

With reference to FIG. 9, first, a requesting source program checks whether it has location information of required service (Step 901).

When having the location information of the required service, ask a program of the location information for required service (Step 903).

On the other hand, when failing to have the location information of the required service, ask the repository service unit 35 for location information of the service in question to obtain the same (Step 902).

Next, using the obtained location information, ask a program of the location information for service (Step 903).

After requesting, wait for a reply of the service (Step 904) and when receiving no reply, return to Step 902 to request location information of the service in question (Step 902).

When receiving a reply, end the service requesting processing.

In the following, operation according to the present embodiment will be described in detail with respect to a specific example of information.

FIG. 10 shows one example of data stored in the service provision information DB 31, the service provision information DB 11 and a service provision information DB 21 in FIG. 1 according to the present embodiment.

In the following, a flow of repository service activation will be described by using the service provision information DB 31 shown in FIG. 10. Since the following description will be made with reference to FIG. 2, the step numbers in FIG. 2 will be denoted in the description. In addition, the main part of FIG. 1 will be referred to as required.

First, start up the program starting unit 32 by the computer 3 in FIG. 1. Ordinarily, this processing is conducted automatically at the time of start-up of the computer 3.

Start the program starting unit 32 (Step 201) and then refer to the data in the service provision information DB 31 (Step 202).

The program starting unit 32 refers to the data of the service provision information DB 31 shown in FIG. 10 to obtain information that the repository service unit 35 "starts at the time of starting the computer".

Next, the program starting unit 32 determines that the repository service unit 35 should be started (Step 203) to start the repository service unit 35 (Step 204).

Reference to the data of the service provision information DB 31 (Step 205) finds that there is no other service to be started (Step 206).

Thereafter, the program starting unit 32 starts main processing (Step 208).

Next, by using the data of the service provision information DB 11 shown in FIG. 10, a flow at the time of starting a program will be described. Since FIGS. 4, 5 and 8 will be referred to, the numbers of the figures and the step numbers will be denoted in the description. In addition, the main part of FIG. 1 will be referred to as required.

Reference to the data of the service provision information DB 11 finds that the program A13 is started by the program starting unit 12 at the time of starting the computer 1. When the program A13 is started on the computer 1, notification is given by broadcast that the program A13 is started (Step 801 in FIG. 8).

The repository service unit 35 waiting at a request reception state (Step 401 in FIG. 4) receives the notification that the program A13 is started.

In addition, confirming that the notification is about service activation (Step 402 in FIG. 4) to start the service activation reception processing (Step 403 in FIG. 4). The flow of the processing has been described in FIG. 5.

Record in the repository DB5 that the program A13 is started on the computer 1 (Step 501 in FIG. 5) to transmit the location information of the repository service unit 35 to the program A13 on the computer 1 (Step 502 in FIG. 5).

Upon receiving the notification (Step 802 in FIG. 8), the program A13 stores that the repository service unit 35 operates on the computer 3 (Step 803 in FIG. 8). Thereafter, shift to the main processing of the program (Step 804 in FIG. 8).

Next, as another specific example, by using the service provision information DB 21 shown in FIG. 10, description will be made of a flow of processing in which when a request is made to a program B24 of the service B yet to be started, the program B24 will be automatically started. Since the following description will be made with reference to FIGS. 3, 4, 6 and 9, the numbers of the respective figures and the step numbers will be denoted in the description. In addition, the main part of FIG. 1 will be referred to as required.

When a program A23 of the computer 2 makes a request for service to the program B24 yet to be started, the program A23 first checks the location of the program B24 (Step 901 in FIG. 9).

Since at this time point, the program A23 is yet to obtain the location of the program B24, it inquires of the repository service unit 35 about the location information of the service B (Step 902 in FIG. 9).

The repository service unit 35 accepts the request (Step 401 in FIG. 4).

Next, determine that the request is for location information inquiry to conduct location information inquiry processing (Step 404 in FIG. 4). The flow of this processing has been described in FIG. 6.

The repository service unit 35 searches the repository DB 5 to check whether the program of the service B is started or not (Step 601 in FIG. 6).

Since at this time point, the program of the service B is yet to be started, determination is made that the service B fails to exist (Step 602 in FIG. 6).

Next, search for a computer which can start the program of the service B by broadcast (Step 605 in FIG. 6).

On the computers 1, 2, 3 and 4, the program starting units 12, 22, 32 and 42 are operating to accept a request (Step 301 in FIG. 3).

Here, the service B determines whether the request is one for checking whether the program can be started or not (Step 306 in FIG. 3).

The program starting units 12, 22, 32 and 42 refer to the service provision information DBs 11, 21, 31 and 41 of the computers 1, 2, 3 and 4 in question, respectively (Step 307 in FIG. 3).

With reference to FIG. 10, since the service B exists only in the service provision information DB 21, only the program starting unit 22 of the computer 2 responds to the repository service unit 35.

Since what is obtained by the repository service unit 35 is data from the computer 2, make a request for activating the service B to the program starting unit 22 of the computer 2 (step 608 in FIG. 6).

As is already described, on the computers 1, 2, 3 and 4, the program starting units 12, 22, 32 and 42 are operating, respectively, to wait at a request reception state (Step 301 in FIG. 3).

The program starting unit 22 of the computer 2 receives a request for starting the program B 24 to refer to the service provision information DB 21 (Step 303 in FIG. 3).

Since the reference finds that the service B can be started (Step 304 in FIG. 3), start the program B24 (Step 305 in FIG. 3).

The repository service unit 35 having made the service B activation request replies to the program A23 of the computer 2 with the computer 2 as the location information of the service B (Step 609 in FIG. 6).

The program A23 receives the information (Step 902 in FIG. 9) to make a service request to the program B24 of the computer 2 (Step 903 in FIG. 9).

While the program A23 of the computer 2 receives a reply from the program B24 of the same computer 2 (Step 904 in FIG. 9), if no reply is received, return to Step 902 to repeat the same processing.

Thus, because seen from the side of the service A, activation of the service B is conducted irrespective of the program A23 of the service A, a service request can be made without considering location and an activation state of the service B.

Next, as another specific example, description will be made of a flow of processing conducted in a case where with the program A13 operating on the computer 1, the computer 1 develops a failure, so that with the service A stopped, the program B24 of the computer 2 makes a service request to a program of the service A. For the description with reference to FIGS. 9 and 10, the step numbers in FIG. 9 will be denoted in the description. The main part of FIG. 1 will be referred to as required.

The program B24 of the computer 2 has made a service request to the program A13 several times and obtains the fact that the program A13 is operating on the computer 1 as information (Step 901).

Therefore, make a request to the program A13 (Step 903). However, the computer 1 develops a failure, so that no reply is received from the program 13A which provides the service A.

Noticing no reply, the program B24 of the computer 2 (Step 904) returns to Step 902 to inquire of the repository service unit 35 about location information of the service A.

Reference to FIG. 10 finds that the program of the service A is operable only on the computer 1 and the computer 2. However, because the computer 1 has a failure, only the computer 2 is operable in practice. While the repository service unit 35 searches for a computer which can operate the service A, only the computer 2 responds, so that the unit makes a request for activating the program A23 to the computer 2 and replies to the program B24 with the location information of the program A23. The program B24 receives the information (Step 902) and makes a service request to the program A23 operating on the computer 2 (Step 903) to receive a reply (Step 904).

Thus, even when certain service stops due to a failure of a computer, if the service is operable on other computer, it is possible to continue the service provision.

Next, description will be made of a flow of preserving data in the repository DB 35 in FIG. 1 by the program. For the description with reference to FIGS. 4 and 7, the numbers of figures and the step numbers will be denoted in the description. In addition, the main part of FIG. 1 will be referred to as required.

The repository service waits at a request reception state (Step 401).

When the program makes a request for repository registration of data to the repository service unit 35, the repository service unit 35 starts repository registration processing (Step 405 in FIG. 4).

The repository service unit 35 stores data whose registration is requested in the repository DB 5 (Step 701 in FIG. 7).

Then, return a response to the requesting source that the storage processing succeeds or fails (Step 702 in FIG. 7).

By the program, always storing data required by the program itself into the repository DB 5 enables the program, which is re-started, to return to a state as of before re-start with ease.

The function of the repository service unit 35 of the computer 3 according to the present embodiment can be realized not only by hardware but also as software by executing, on the computer 3, a repository service control program (application) 50 which executes the above-described functions. The repository service control program 50 is stored in a magnetic disk, a semiconductor memory or other recording medium and loaded from the recording medium into the computer 3 as a computer processing device to control operation of the computer processing device, thereby realizing the above-described respective functions.

Although the present embodiment has been described with respect to a case where the repository service unit 35 is provided in the computer 3, the unit is not necessarily provided within a computer and can be provided outside a computer as long as it is within the system. In this case, location information of the repository service unit can be assigned a different number irrespective of location information of the computer.

According to the foregoing described embodiment, in a service providing system in which a program operating on a computer provides services to other computer through a network, because a computer which receives service is allowed to always obtain location information of a computer on which a program that provides the service operates, when the computer is not allowed to receive the service due to a failure, maintenance or the like of the computer which provides the information, the computer can receive the service continuously from an alternative computer.

Next, a second embodiment of the present invention will be described in detail with reference to the figures.

FIG. 11 is a block diagram showing a structure of a service providing system according to a second embodiment of the present invention.

The service provision information DB, the program starting unit and the program of each computer are the same as those of the first embodiment described with reference to FIG. 1 and these components are all the same in every computer.

The present embodiment has a structure different from that of the first embodiment shown in FIG. 1 in that repository service units 25, 35 and 45 are provided in a plurality of computers. Moreover, a data sharing unit 6, a monitoring unit 7, and monitoring service units 27 and 47 are additionally provided. In the following, additionally provided units will be described.

The data sharing unit 6 is a means which shares data of the respective repository service units 25, 35 and 45. In addition, the unit 6 provides the repository service units 25, 35 and 45 with a function of enabling the computers 2, 3 and 4 connected to the data sharing unit 6 to read/write from/to the repository DB 5. In other words, the repository DB 5 can be made read/written from the computers 2, 3 and 4 through the data sharing unit 6.

For the data sharing unit 6, existing techniques are used. Used, for example, are file sharing by NFS (Network File System), a disk which can be multi-path wired and an application function of a data base. The data sharing function enables the computers 2, 3 and 4 connected to the data sharing unit 6 to activate the repository service units 25, 35 and 45.

The monitoring service units 27 and 47 have the function of respectively monitoring the repository service unit 25 and the repository service unit 45 of the computers connected to the network and when detecting the unit being not operating, starting the repository service unit of the computer in which each unit is provided.

The monitoring unit 7 monitors the monitoring service units 27 and 47.

Next, operation of the present embodiment will be described in detail with reference to the drawings.

FIG. 12 is a flow chart for use in explaining processing of the monitoring unit 7 according to the present embodiment. The processing is started in another thread or another process at the time of starting the repository service units 25, 35 and 45.

First, using the function of repository service, search for monitoring service (Step 1201).

Check a search result (Step 1202) and when failing to find the monitoring service, return to Step 1201 to again search for monitoring service.

When the monitoring service is found, check whether the service is actually in operation (Step 1203).

When the service in not in operation, search for monitoring service (Step 1201).

When the service is in operation, continue checking operation (Step 1203).

Next, description will be made of activation processing and main processing of the monitoring service units 27 and 47. The activation processing prior to the main processing can be conducted in the same manner as that of the program activation processing shown in FIG. 8. In the following, the description will be made of the main processing.

Figure 13:
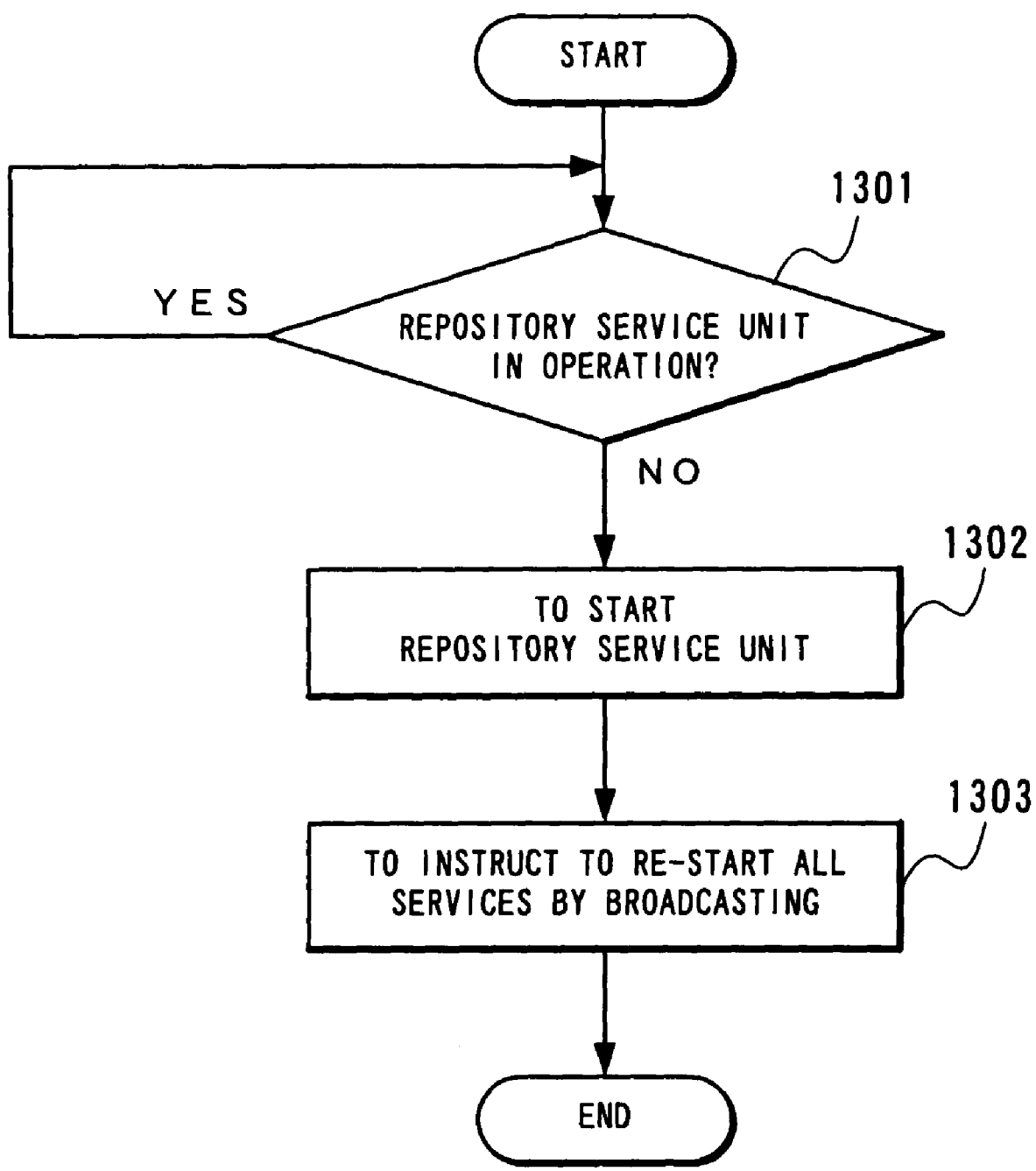
FIG. 13 is a flow chart for use in explaining main processing of monitoring service according to the second embodiment of the present invention.

FIG. 13 is a flow chart for use in explaining the main processing of the monitoring service units 27 and 47 according to the present embodiment. The main processing is equivalent to Step 804 in FIG. 8. In the following, the description will be made with respect to a case of the monitoring service unit 27.

With reference to FIG. 13, the monitoring service unit 27 continues checking whether the repository service units 25, 35 and 45 are in operation (Step 1301).

When the unit is not in operation, start the repository service 25 (Step 1302).

Thereafter, by broadcasting, the monitoring service unit 27 gives to the program starting units 12, 22, 32 and 42 an instruction to re-start all the services (Step 1303).

FIG. 14 is a flow chart for use in explaining a flow of initial processing of the repository service units 25, 35 and 45 according to the present embodiment. The initial processing is used when there exist a plurality of repository service units. In the following, the description will be made of a case of the repository service unit 25.

With reference to FIG. 14, the repository service unit 25 first searches for repository service unit by broadcasting (Step 1401).

Simultaneously, the monitoring unit 7 is started in another thread or another process.

The repository service unit 25 determines whether other repository service is in operation or not (Step 1402) and when it is already operating, ends the processing (Step 1405).

When no other repository service is in operation, start the monitoring service (Step 1403).

The repository service main processing to follow is the same as that in FIG. 4.

In the following, operation according to the present embodiment will be described in detail with respect to a specific example of data.

FIG. 15 shows one example of data to be stored in the service provision information DB 31, the service provision information DB 41 and the service provision information DB 21. With reference to FIG. 15, the repository service is provided by the computer 3 and the monitoring service is provided by the computers 4 and 2.

With the repository service unit 35 operating on the computer 3 and the monitoring service unit 47 operating on the computer 4, a condition in which the computer 3 develops a failure will be described. Because the description will be made with reference to FIGS. 12, 13 and 14, the figure numbers and the step numbers will be denoted in the description. In addition, the main part of FIG. 1 will be referred to as required.

When the computer 3 develops a failure, operation of the repository service unit 35 stops. The monitoring service unit 47 operating on the computer 4 senses operation stop of the repository service unit 35 (Step 1301 in FIG. 13) to start the repository service unit 45 (Step 1302 in FIG. 13).

The repository service unit 45 is activated (Step 1401 in FIG. 14).

Simultaneously, the monitoring unit 7 is started in another thread or another process.

Next, search for other repository service (Step 1402 in FIG. 14) to check whether repository service is operating on other computer (Step 1403 in FIG. 14).

Next, the monitoring service unit 47 which has started the repository service unit 45 gives to all the programs a re-start instruction (Step 1303 in FIG. 13).

As a result, location information of the repository service units stored in all the programs is updated from the computer 3 to the computer 4.

The first embodiment has a shortcoming that because the repository service unit 35 is provided only on the computer 3, repository service can not be provided when the computer 3 develops a failure. According to the present embodiment, provision of repository service and monitoring of repository service by a plurality of computers enable provision of repository service to be continued at the time of a failure of a computer, thereby enhancing the failure-resistant function of the service providing system.

The service providing system, the computer and the repository service control program according to the present invention achieve the following effects.

First, in a service providing system in which a program operating on a computer provides service to other computer through a network, because a computer which receives service is allowed to always obtain location information of a computer on which a program that provides the service operates, when the computer is not allowed to receive the service due to a failure, maintenance or the like of the computer which provides the information, the same service can be continuously received from an alternative computer.

Second, because in the above-described system, a computer which receives service is always allowed to obtain location information of a computer on which a program that provides the service operates, at the time of a failure, maintenance or the like of a computer which provides information, access to an alternative computer will be extremely easy which would be difficult when location information can not be obtained.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A system of providing, through a network, a service which is provided by a program executed on a first computer to a second computer, comprising:

a program providing unit executed by a processing device of the first computer which provides said service, when a third computer is in a failure condition, from the first computer to said second computer, which receives said service; and a repository service unit executed by a processing device which provides a service of managing location information for uniquely identifying, on said network, a computer on which said program that provides said service operates; and a repository data base which stores said location information;

wherein said repository service unit:
  searches said repository data base, when accepting an inquiry of location information of an activating computer which activates said program that provides said service from a program operating on any of a plurality of computers on said network,
  searches a computer which can activate said program that provides said service, when said program that provides said service is not in operation on any of said plurality of computers,
  makes a request for activating said program that provides said service to the searched computer which can activate said program that provides said service, and
  replies said location information of said computer which can activate said program that provides said service to said program having made said inquiry of location information.

2. The system as set forth in claim 1, wherein said repository service unit is provided in a specific computer among a plurality of computers on said network.

3. The system as set forth in claim 1, wherein
said repository service unit is provided in a specific computer among a plurality of computers on said network, and
said repository service unit conducts processing of replying, to a request from said program operating on any of said plurality of computers, with location information of an activating computer which activates said program that provides said service and processing of rewriting data of said repository data base which stores said location information in response to a request from said program that provides said service.

4. The system as set forth in claim 3, wherein
the processing of rewriting data of said repository data base rewrites the data of said repository data base in response to a request from said program that provides said service and replies to said program that provides said service with a result of the rewriting.

5. The system as set forth in claim 3, wherein
when said program that provides said service makes a service request to a other computer, said program that provides said service checks whether said program that provides said service has location information of said other computer and when said program that provides said service fails to have the information, requests an inquiry of said location information from said repository service unit.

6. The system as set forth in claim 1, wherein
said repository service unit is provided in a specific computer among a plurality of computers on said network, and
said repository service unit further conducts processing of replying, to an inquiry from said program activated, with said location information of said specific computer having said repository service unit.

7. The system as set forth in claim 1,
wherein said repository service unit searches a computer which can activate said program that provides said service by making broadcasting flow through said network to ask a computer which can activate said program that provides said service for a reply, when said program that provides said service is not in operation on any of said plurality of computers.

8. The system as set forth in claim 1, wherein
said repository service unit being provided in a specific computer among a plurality of computers on said network, and
said plurality of computers each include a program starting unit which starts a program that provides said service and a service provision information data base which stores information about a kind of said service and information about a kind of said service to be started at the time of starting of a computer of the plurality.

9. The system as set forth in claim 8, wherein
said program starting unit is started simultaneously with activation of said computer of the plurality.

10. The system as set forth in claim 8, wherein
said program starting unit is started simultaneously with activation of said computer of the plurality, and
processing of starting said program starting unit refers to information of said service provision information data base and when activation is necessary, starts said repository service unit and when there exists other program required to be started, starts said other program.

11. The system as set forth in claim 8, wherein
said program starting unit is started simultaneously with activation of said computer of the plurality, and
main processing of said program starting unit includes processing of, after accepting a request from programs of said plurality of computers, referring to said service provision information data base to determine whether said service corresponding to said request can be started or not, and when said service can be started, starting or re-starting a program which provides said service.

12. The system as set forth in claim 1, wherein
said repository service unit is provided in at least one computer among a plurality of computers on said network.

13. The system as set forth in claim 12, wherein
a monitoring service unit which monitors operation of said repository service unit is provided in said at least one computer.

14. The system as set forth in claim 12, wherein
a monitoring service unit which monitors operation of said repository service unit is provided in said at least one computer, and which further comprises:
a monitoring unit which monitors operation of said monitoring service unit, and
a data sharing unit for sharing location information data managed by said repository service unit among the computers.

15. The system as set forth in claim 14, wherein processing of said monitoring unit searches said monitoring service unit to continue checking operation of said monitoring service unit.

16. The system as set forth in claim 12, wherein
a monitoring service unit which monitors operation of said repository service unit is provided in said at least one computer, and
processing of said monitoring service unit monitors said repository service unit provided at said at least one computer, and when none of said repository service units operates, starts any of the repository service units.

17. The system as set forth in claim 12 wherein
a monitoring service unit, which monitors operation of said repository service unit, is provided in said at least one computer, and
initial processing of said repository service unit refrains from starting said repository service unit when other repository service unit operates.

18. A method of providing a service through a network, comprising:

uniquely identifying, on said network, a computer on which said program that provides said service operates; and accepting an inquiry of location information of an activating computer which activates said program that provides said service from a program operating on any of a plurality of computers on said network, and searching a repository data base when accepting the inquiry, searching a computer which can activate said program that provides said service, when said program that provides said service is not in operation on any of said plurality of computers, making a request for activating said program that provides said service to the searched computer which can activate said program that provides said service, and replying with said location information of said computer which can activate said program that provides said service to said program having made said inquiry of location information.

19. The method as set forth in claim 18, further comprising the step of:

replying to an inquiry from said program activated, with said location information of said computer having said repository service unit.

20. The method as set forth in claim 18, further comprising the step of:

searching a computer which can activate said program that provides said service by making broadcasting flow through said network to ask a computer which can activate said program that provides said service for a reply, when said program that provides said service is not in operation on any of said plurality of computers.

21. The method as set forth in claim 18, further comprising the step of:

rewriting data of said repository data base in response to a request from said program that provides said service.

22. The method as set forth in claim 21, wherein the processing of rewriting data of said repository data base rewrites the data of said repository data base in response to a request from said program that provides said service and replies to said program that provides said service with a result of rewriting.

23. The method as set forth in claim 18, further comprising the step of:

starting a program starting unit that starts a program that provides said service, and storing information about a kind of said service and information about a kind of said service to be started at the time of starting a computer.

24. The method as set forth in claim 23, wherein starting said program starting unit refers to information of said service provision information data base, and when activation is necessary, starts said repository service unit, and when there exists other program required to be started, starts said other program.

25. A computer-readable medium with program code embodied therein for causing when executed, a computer system to provide a provides service through a network by execution of a program, comprising the functions of:

a repository service function of providing a service of managing location information for uniquely identifying, on said network, a computer on which said program that provides said service operates wherein said repository service function includes:

a function of searching a repository data base which stores said location information, when accepting an inquiry of location information of an activating computer which activates said program that provides said service from a program operating on any of a plurality of computers on said network, a function of searching a computer which can activate said program that provides said service, when said program that provides said service is not in operation on any of said plurality of computers, a function of making a request for activating said program that provides said service to the searched computer which can activate said program that provides said service, and a function of replying said location information of said computer which can activate said program that provides said service to said program having made said inquiry of location information.

26. The computer-readable medium as set forth in claim 25, further comprising:

a function of replying, to an inquiry from said program activated, with said location information of said computer having said repository service unit.

27. The computer-readable medium as set forth in claim 25, wherein said repository service function includes a function of searching a computer which can activate said program that provides said service by making broadcasting flow through said network to ask a computer which can activate said program that provides said service for a reply, when said program that provides said service is not in operation on any of said plurality of computers.

28. The computer-readable medium as set forth in claim 25, wherein:

said repository service function includes a a function of rewriting data of said repository data base in response to a request from said program that provides said service.

* * * * *